(12) United States Patent
Kannan et al.

(10) Patent No.: US 11,204,983 B2
(45) Date of Patent: Dec. 21, 2021

(54) SCORING CLOUD PACKAGES FOR RISK ASSESSMENT AUTOMATION

(71) Applicant: salesforce.com, inc., San Francisco, CA (US)

(72) Inventors: Prashanth Kannan, Sunnyvale, CA (US); Bharat Ramakrishnan Srinivasan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 68 days.

(21) Appl. No.: 16/727,241

(22) Filed: Dec. 26, 2019

(65) Prior Publication Data

US 2021/0200840 A1    Jul. 1, 2021

(51) Int. Cl.
*G06F 21/12* (2013.01)
*G06F 21/54* (2013.01)
*G06F 8/73* (2018.01)

(52) U.S. Cl.
CPC .............. *G06F 21/121* (2013.01); *G06F 8/73* (2013.01); *G06F 21/54* (2013.01)

(58) Field of Classification Search
CPC .......... G06F 21/121; G06F 8/73; G06F 21/54; G06F 21/10; G06F 8/70; G06F 21/50; G06F 21/52; G06F 21/12
See application file for complete search history.

(56) References Cited

U.S. PATENT DOCUMENTS

| | | | |
|---|---|---|---|
| 7,016,669 B2 | 3/2006 | Aerrabotu et al. | |
| 7,406,333 B2 | 7/2008 | Aerrabotu et al. | |
| 7,949,684 B2 | 5/2011 | Brooks et al. | |
| 8,495,072 B1 | 7/2013 | Kapoor et al. | |
| 8,671,099 B2 | 3/2014 | Kapoor et al. | |
| 8,855,118 B2 | 10/2014 | Kannan | |
| 9,036,665 B2 | 5/2015 | Kannan | |
| 9,379,899 B2 | 6/2016 | Kannan | |
| 10,769,250 B1 * | 9/2020 | Tautschnig | G06F 8/436 |
| 2004/0192386 A1 | 9/2004 | Aerrabotu et al. | |
| 2004/0198310 A1 | 10/2004 | Aerrabotu | |
| 2004/0198311 A1 | 10/2004 | Aerrabotu et al. | |

(Continued)

FOREIGN PATENT DOCUMENTS

EP          2115998 B1      5/2013

*Primary Examiner* — Quazi Farooqui
(74) *Attorney, Agent, or Firm* — Kowert, Hood, Munyon, Rankin & Goetzel, P.C.

(57) ABSTRACT

Techniques are disclosed for determining whether to permit distribution of a software package—for example, via an application exchange service of a cloud computer system. The computer system may calculate a risk score for the software package based on various factors, including package metadata that specifies one of a plurality of package types supported by the application exchange service. The specified package type may be indicative of an amount of developer control on the software package after distribution. Based on comparing the calculated risk score to a risk threshold, the computer system may determine whether to permit distribution of the software package via the application exchange service. Scoring software packages based on package metadata may reduce the number of packages requiring manual review, which may advantageously reduce an amount of time between package development and deployment.

20 Claims, 7 Drawing Sheets

(56) References Cited

U.S. PATENT DOCUMENTS

| | | | |
|---|---|---|---|
| 2010/0241469 A1* | 9/2010 | Weigert | G06F 11/3604 |
| | | | 717/124 |
| 2011/0202911 A1 | 8/2011 | Brooks et al. | |
| 2018/0248702 A1* | 8/2018 | Wu | H04L 9/3247 |
| 2019/0340283 A1* | 11/2019 | Schneider | G06F 21/6227 |
| 2020/0118028 A1* | 4/2020 | Harris | G06N 5/02 |
| 2021/0103528 A1* | 4/2021 | Pelton | G06F 21/6227 |

* cited by examiner

600

Receive, from a developer, a request that specifies a software package to be distributed to an application exchange service of a cloud computer system.
610

Calculate a risk score for the software package based on package metadata of the software package, where the package metadata specifies one of a plurality of package types supported by the application exchange service, and where the specified package type is indicative of an amount of control of the developer on the software package after distribution.
620

Determine, based on a comparison of the calculated risk score to a risk threshold, whether to permit distribution of the software package to users via the application exchange service.
630

Fig. 6

SCORING CLOUD PACKAGES FOR RISK ASSESSMENT AUTOMATION

BACKGROUND

Technical Field

This disclosure relates generally to cloud computer systems, and, more specifically, to software packages developed for cloud-based systems.

Description of the Related Art

Software packages for applications may be developed in various environments, including a cloud-based platform as a service (PaaS) environment. Software is installed on the cloud-based PaaS environment and then this software is accessible on various end-user devices over the internet. This is unlike other environments where applications are downloaded and installed directly onto end-user devices (e.g., mobile devices). To facilitate dissemination, software packages may be made available for download on a centralized site such as an application exchange service. Notably, the security risk for software that is utilized in a cloud-based enterprise environment is typically greater than for software that runs a web browser plug-in or on a mobile device since many more computer systems may be affected. Accordingly, security is of paramount importance for an application exchange service that includes software packages for enterprise use. But since the premise of an application exchange service is to promote wide dissemination of software, it may often be the case that a large number of software packages are submitted for upload to an application exchange service at a given time. This contention may cause a delay in approval of software packages by the application exchange service.

BRIEF DESCRIPTION OF THE DRAWINGS

FIG. 6 is a flow diagram illustrating a method for determining whether to permit distribution of a software package based on package metadata of the software package, according to some embodiments.

Figure 1:
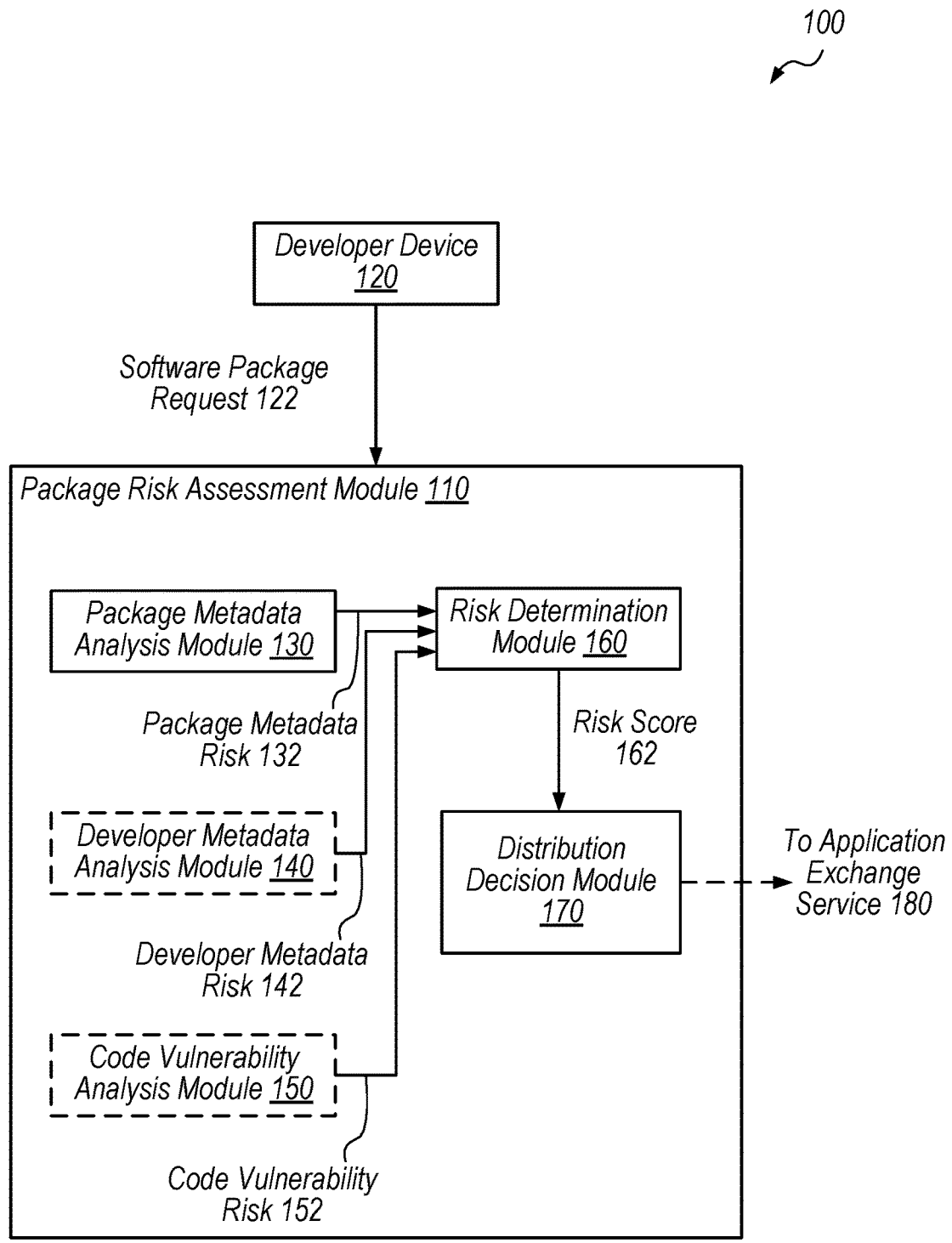
FIG. 1 is a block diagram illustrating a package risk assessment module for determining whether to permit distribution of requested software packages, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to calculate a risk score for a software package" is intended to cover, for example, a computer system having a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

DETAILED DESCRIPTION

As used herein, a software "package" refers to a collection of information used for installing (or upgrading) software on a computer. For example, a software package may take the form of a container that includes program code for installation, as well as additional information that is used only during the installation package. Such containers may include program code for components (e.g., an object or field), an application, a set of related applications, or any combination thereof. Software packages may have various formats on various platforms. A software package may include one or more of the following: files, programs, classes, libraries, etc. In some cases, software packages may be used to distribute updates to one or more applications in a cloud computing environment. In still other cases, software packages may be used as plugins to software as a service (SaaS) applications to extend their functionality.

Software packages may be developed in different environments, including a platform as a service (PaaS) environment for plugin into software as a service (SaaS) applications to extend the functionality of such applications. These software packages may be newly developed packages or may include updates to a previously approved software package or application. These packages may be offered for download on a site such as an application exchange service (e.g., a cloud marketplace). As noted, it is imperative that software distributed via a centralized site for enterprise use meets security standards. Consequently, newly developed cloud-based software packages that are submitted for upload to an exchange service may require extensive manual review by the entity operating the site before the package is permitted to be downloaded by users of the site. The present inventors have recognized that current techniques for reviewing software packages involve tedious manual review prior to deployment and often introduce delays in the availability of newly developed software packages.

The present disclosure describes techniques for analyzing different categories of data for newly developed software packages in order to make a security assessment for the software package. One such category is metadata related to the package itself. The result of the security assessment may be to perform various actions, such as authorizing, rejecting, or delaying distribution of these packages via an application exchange service. Once a software package has been analyzed according to various categories of data, it may be approved and deployed in the cloud environment; alternately, it may be sent to a queue for further review.

When making a security assessment for a software package, in various embodiments, a cloud computer system may perform an analysis of package metadata, metadata about the developer of the package, the program code within the package, or any combination of the above. In some cases, a developer of a software package may be notified of one or more issues identified during analysis of the package. In such situations, the notification sent to the developer of the software package may include details for how the one or more identified issues affect the security assessment of the software package, which may advantageously allow the developer to more quickly correct the identified issues. In this manner, the cloud computing system may assist developers during future development of software packages, as well as improving the quality of the software package that is currently being assessed prior to ultimate approval and deployment. In other situations, the cloud computer system may automatically approve the newly developed software package for deployment.

Security analysis techniques described in this disclosure may advantageously reduce the number of newly developed software packages that require manual review by a system administrator by providing for automatic approval of software packages that satisfy a security assessment. In some situations, the reduced number of packages awaiting manual review may advantageously increase the availability of system resources and may reduce the amount of time between development and deployment of software packages.

Example Package Risk Assessment

FIG. 1 is a block diagram illustrating a package risk assessment module 110 for determining whether to permit distribution of requested software packages. In the illustrated embodiment, cloud computer system 100 includes package risk assessment module 110 that receives requests 122 for distribution of software packages developed on developer device 120.

Developer device 120, in the illustrated embodiment, sends a request 122 with a software package to package risk assessment module 110. In some embodiments, request 122 includes credentials for a user of developer device 120. The software package included in request 122 may be a container for one or more of a field, an object, an application, a set of related applications, etc. and the container may include one or more updates for these items.

Package risk assessment module 110, in the illustrated embodiment, includes package metadata analysis module 130. In some embodiments, package risk assessment module 110 includes developer metadata analysis module 140 and code vulnerability analysis module 150. Package metadata analysis module 130, in the illustrated embodiment, determines package metadata risk 132 for the software package included in software package request 122. In some embodiments, package risk assessment module 110 determines developer metadata risk 142 and code vulnerability risk 152 (via developer metadata analysis module 140 and code vulnerability analysis module 150) for the software package in addition to determining package metadata risk 132. In one embodiment, then, three different types of risk may be used to determine an overall risk score for the software package which, in turn, may be used to perform various actions, such as approving or denying the software package for distribution via application exchange service 180, or queueing the package for manual review. Note that package metadata risk 132, developer metadata risk 142, and code vulnerability risk 152 may be values, scores, or any type of information that indicates, on a spectrum, risk for a software package within these three categories.

In some cases, determining package metadata risk 132 alone may be sufficient for determining a risk score 162 for the software package. For example, before evaluating developer metadata risk 142 or code vulnerability risk 152 for a software package, package risk assessment module 110 may determine, based on package metadata risk 132, that the risk score 162 for the software package satisfies a risk threshold (and therefore, module 110 may be able to make a distribution decision prior to determining developer metadata risk 142 or code vulnerability risk 152). In some situations, this allows package risk assessment module 110 to determine an overall security risk for a package more quickly than if this module were to determine individual security risks associated with the package (e.g., determining individual security risks associated with the developer and program code of the package).

Developer metadata risk 142 is determined based on information (e.g., metadata) about the developer of the software package. The developer, as this term is used, is an entity associated with either the coding, distribution, or release of the software package. Metadata about a developer refers to information that is external to the software package itself. One example is historical information about software packages previously submitted by the developer. This information may include ratings relating to bug reports or user reviews of the software. Other types of historical information might include a rating of the developer by the application exchange service that is based on past experience. In some cases, third-party information services might be used to access developer metadata.

In contrast to developer metadata risk 142, code vulnerability risk 152 for a software package is determined based on one or more analyses of the actual program code within the package. Some representative types of code vulnerability analysis are described below with reference to FIG. 5.

Finally, risk score 162 for a software package may be determined based on metadata about the software package itself. Package metadata stands in distinction to metadata about the developer of the software package and program code within the software package. Specifically, package metadata does not include information about the content of the code in a package, or information external to the package that may be gleaned about the developer from external sources. One example of package metadata is an indication of a type of the package. Different software platforms (such as platforms developed by SALESFORCE.COM) may have different types of package formats. In some cases, certain package formats may be considered to be more robust than other package formats—that is, have additional requirement/ restrictions that are indicative of attributes such as increased security and better programming practices. Accordingly, in some instances, knowing that a software package has a particular package format can influence its computed risk score.

Package risk assessment module 110, in the illustrated embodiment, includes risk determination module 160 and distribution decision module 170 for generating risk scores 162 for software packages and for determining whether to permit distribution of one or more requested software packages, respectively. In some embodiments, risk determination module 160 and distribution decision module 170 are combined into a single module that determines both a risk score 162 and a distribution decision for a software package.

Risk determination module 160 calculates a risk score 162 for the software package based on the package metadata risk 132. Package metadata risk 132 may be determined based on properties specified in the package metadata of the software package, such as namespace properties, package type, etc. For example, the package metadata may specify a package type that is supported by an application exchange service 180 of the cloud computer system 100. In some situations, the risk score 162 is calculated based on the developer metadata risk 142 and the code vulnerability risk 152 in addition to the package metadata risk 132. Analysis of package metadata risk 132, developer metadata risk 142, and code vulnerability risk 152 are discussed in further detail below with reference to FIG. 3.

Distribution decision module 170, in the illustrated embodiment, compares a calculated risk score 162, for a requested software package, received from risk determination module 160 to a risk threshold. This risk threshold may be a dynamic risk threshold such that a system administrator of the package risk assessment module 110 may adjust this threshold. Based on the comparison, distribution decision module 170 sends a notification to an application exchange service 180 that specifies whether to permit distribution of the software package included in request 122. For example, if the software package is approved for distribution, distribution decision module 170 may supply the software package to application exchange service 180 for installation by various devices within the cloud computing environment (discussed below with reference to FIG. 2). If, however, the software package is not approved for distribution, module 170 does not send the software package to the application exchange server 180.

In some embodiments, distribution decision module 170 sends the software package to a queue for manual review by a system administrator. In addition, the distribution decision module 170 may send a risk score 162 associated with the software package, for example. In this example, the software package may be prioritized within the queue based on its risk score 162. In some embodiments, distribution decision module 170 maintains a risk threshold over time based on various software package requests 122 and risk scores 162 calculated for the various software packages included in requests 122. Such thresholds and risk scores 162 may be used by distribution decision module 170 in making distribution decisions for future newly developed software packages.

In some embodiments, multiple risk thresholds are maintained by distribution decision module 170. For example, a first risk threshold may specify to automatically reject a requested software package. As another example, a second risk threshold may specify a time period within which the software package must be reviewed by a system administrator. As yet another example, a third risk threshold may specify to automatically approve a software package for deployment.

Example Cloud Computing Environment

Figure 2:
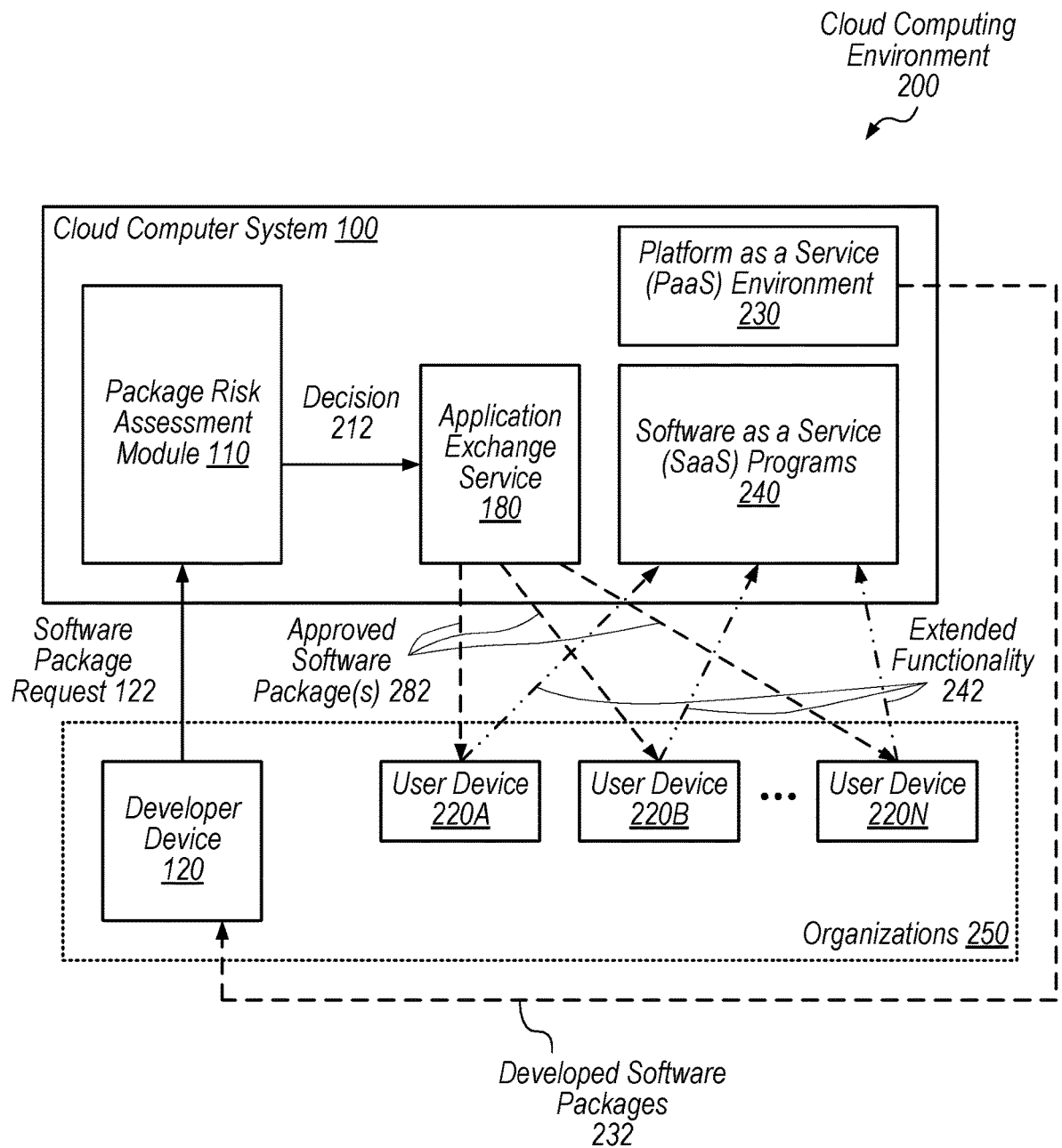
FIG. 2 is a block diagram illustrating an example cloud computing environment that includes a cloud computing system used to develop software packages, according to some embodiments.

FIG. 2 is a block diagram illustrating an example cloud computing environment 200 that includes a cloud computing system 100 used to generate developed software packages 232. In the illustrated embodiment, cloud computer system 100 includes a platform as a service (PaaS) environment 230 for developing software packages that are installable by organizations 250 of the cloud computer system 100 to extend the functionality of software as a service (SaaS) programs 240.

A user of developer device 120, in the illustrated embodiment, generates a newly developed software package 232 via PaaS environment 230 and sends a software package request 122 to package risk assessment module 110 of cloud computer system 100. One example of PaaS environment 230 in the Salesforce context is Force.com. Package risk assessment module 110, in the illustrated embodiment, sends a distribution decision 212 for the developed software package 232 to application exchange service 180. If the request 122 is approved, the distribution decision may include the developed software package 232.

User devices 220A-220N are associated with one or more organizations 250 and may install one or more approved software packages 282, that have been permitted by package risk assessment module 110, via application exchange service 180. The one or more approved software packages 282 are usable by user devices 220 within their respective organizations. In some cases, these installed, approved software packages 282 may provide extended functionality 242 for SaaS programs 240 accessed by user devices 220. Examples of SaaS programs 240 used by user devices 220 include sales cloud, service cloud, marketing cloud, etc. offered by SALESFORCE.

Example Analysis Modules

Figure 3:
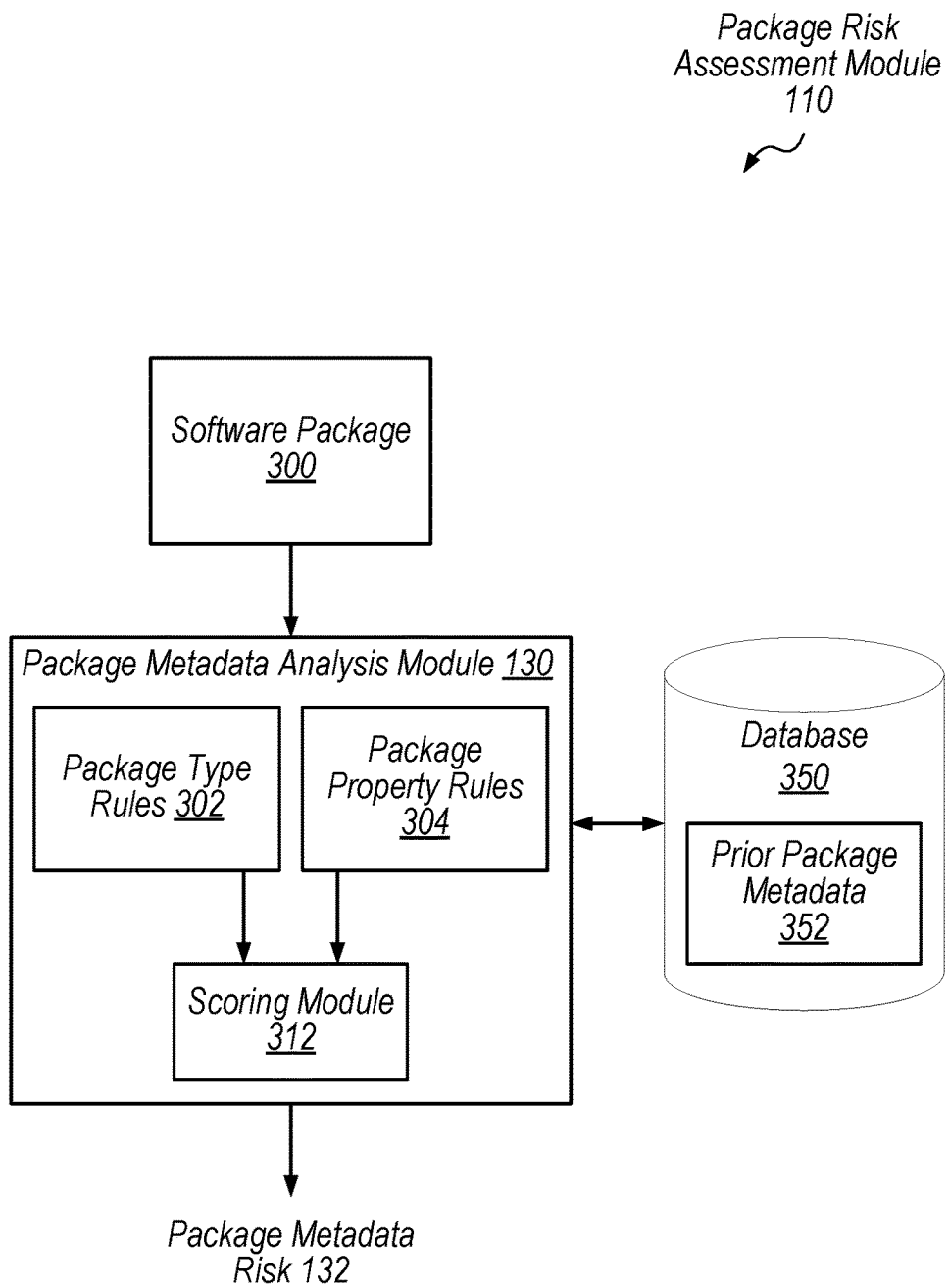
FIG. 3 is a block diagram illustrating an example package metadata analysis module, according to some embodiments.

FIG. 3 is a block diagram illustrating an example package metadata analysis module 130 included in package risk assessment module 110. In the illustrated embodiment, package metadata analysis module 130 determines package metadata risk 132 for a software package 300 requested for inclusion on application exchange service 180. In some embodiments, module 130 accesses database 350 to obtain prior package metadata 352 for determining package metadata risk 132 for software package 300. Package metadata for software package 300 may include various types of information, including object definitions, page layout definitions, a package description, controllers (e.g., controllers used to access a database of the cloud computer system 100), workflow rules, a type of package, a number of lines of code, accessible external endpoints, etc. Specifically, package metadata may include two categories of information: information associated with a package type and information specifying package properties. For example, the former type of information may specify a package type and namespace properties, while the later may specify resource access properties and a package size (with respect to a number of lines of code).

Module 130, in the illustrated embodiment, evaluates software package 300 using package type rules 302 and package property rules 304, and provides evaluation results to scoring module 312. For example, module 130 uses package type rules 302 to evaluate the package type and namespace properties for software package 300. In some embodiments, package type rules 302 indicate risk values associated with different types of packages and different namespace properties. Based on these rules, module 130 may assign a risk value to the package 300.

As one particular example related to package types, packages developed on the SALESFORCE.COM platform may have different package types, including "managed" or "unmanaged" packages. Specifically, a managed package allows the developer of the software package to push upgrades after distribution. As such, this type of package has program code that is hidden from end users, is often licensed, and can be upgraded by the original developer. This type of package locks certain objects from editing in order to allow the software package to be upgraded. A managed package may also obfuscate certain objects from end users in order to secure intellectual property of the original developer. In addition, a managed package supports versioning. In contrast, an unmanaged package allows for editing (by end users) after distribution and does not permit a developer of the managed package to retain control after distribution. This type of package is typically used to distribute open-source software. For example, this type of software package may provide the basic building blocks for developers to generate their own custom application. As such, an unmanaged package allows objects to be edited by end users accessing the software package over the internet. In addition, components and objects of unmanaged packages may be accessible to end users of various different organizations. A third package type may be a hybrid package and may include characteristics of both managed and unmanaged software packages. Note that the concept of managed and unmanaged packages may exist for other platforms and may use varying nomenclature for the specific package types.

Software packages, in some embodiments, vary by namespace properties. As used herein, the term "namespace properties" refers to a region associated with a software package that encompasses components (e.g., fields, objects, methods, classes, etc.) of the package to control access to and modification of the components. For example, namespace properties may protect components of the software package from unauthorized access and duplicate naming, of similar components, across different software packages. Generally, association of a software package with a particular namespace limits access to that package. For example, only users or customers associated with the particular namespace may be able to access and modify the software package. Software package component naming may be controlled by a namespace prefix. For example, a custom object name that includes a namespace prefix of a particular software package will follow the format "namespace_prefix_obj_name." In this example, the namespace prefix "namespace_prefix" is appended to the custom object "obj_name" of the software package.

In some embodiments, a package type specifies namespace properties for managed packages. Package type rules 302 may indicate risk values associated with namespace properties. To prevent duplication in naming, managed software packages will have respective unique namespace prefixes that are appended to the beginning of the names of their components. In some cases, such a naming convention may prevent conflicts between components or objects when new software packages are installed. A particular organization may have a unique namespace for each software package within its organization and components of these software packages will be accessible to users of that particular organization but will not be accessible to users outside of that organization.

In some embodiments, a software package type specifies namespace properties for an unmanaged package. For example, namespace properties of an unmanaged package may specify that the software package does not have a namespace. A software package that does not have a namespace may be vulnerable due to its content being available (e.g., open-source code) to various end users, which may cause data loss issues for the developing entity of the software package. In some situations, this type of software package needs to be uninstalled and then reinstalled in order to upgrade to a newer version of the package, which may cause an end user to lose any customized changes they have made to that software package prior to reinstall. As a result, an unmanaged software package may be associated with higher risk than a managed software package.

In some embodiments, a package type specifies namespace properties for a hybrid package. The namespace properties of a hybrid package may indicate that the package shares a namespace with one or more other packages that belong to a particular organization. For example, a particular tenant of a multi-tenant database system may have its own organization within cloud computing environment 200 and may generate three hybrid software packages that share a single namespace. In this example, the three software packages of the tenant may use the same naming format for their respective components (e.g., package A and package B both have a custom field named "age"). In contrast to managed or unmanaged packages, a hybrid package may be associated with medium risk (e.g., a risk level that is somewhere between a managed and unmanaged package).

As used herein, the term "multi-tenant database system" refers to those systems in which various elements of hardware and software of the database system are shared by one or more customers. For example, a computer system may simultaneously process requests for a great number of customers, and a database table may store rows for a potentially greater number of customers. In various embodiments, data for different tenants may be securely stored such that other tenants cannot access the data, absent permission. Note that database 350 is one example of a database that may be implemented within a multi-tenant database system. For example, database 350 may store historical data, including information about the three types of metadata associated with software packages and this information may be leveraged to evaluate risk associated with such software packages.

In some embodiments, package metadata of software package 300 specifies resource access properties. These properties may include binary values for an application associated with a software package (e.g., an application that is installed or upgraded based on implementation of the software package). For example, within the SALESFORCE-.COM context, a connected application associated with a true value is one that may connect to SaaS programs 240 of the cloud computer system 100 using one or more application programming interfaces (APIs) and one or more authentication protocols to facilitate different sign-in instances by the connected application to various SaaS programs. A software package that includes a non-connected application designation would be associated with a false value according to package property rules 304.

In some embodiments, package metadata analysis module 130 evaluates other resource access properties of software package 300. For example, module 130 may determine whether an application associated with software package 300 is enabled to access website resources that are external to the organization in which the software package is currently installed. For example, software packages may access various resources from other websites using HTTP requests. As another example, module 130 may evaluate whether a software package is enabled for various security enhancements. In the SALESFORCE.COM content, various types of enhancements may be applied to a software package, when it has locker service enabled. Package property rules 304 may specify risk values for a software package that implements a webpage that includes one or more external frames (e.g., one or more objects from a web page that is external to the software package). In the SALESFORCE.COM context, this type of external resource access may be referred to as remote site settings and the package metadata for a software package may indicate whether remote site settings is enabled for the package. Based on determining whether a software package is executable to access these types of external resources, module 130 may assign risk points to the software package 300 using package property rules 304.

Module 130, in the illustrated embodiment, evaluates software package 300 based on a number of lines of code specified in the package metadata of the package. In some situations, module 130 evaluates software package 300 based on a total number of lines of code written for client-side implementation (e.g., for implementing a user interface) of the package. In other situations, module 130 evaluates software package 300 based on a total number of lines of code written for server-side implementation (e.g., for implementing database operations) of the package. In some embodiments, package metadata analysis module 130 assigns risk values to software package 300 based on the total lines of code specified in the package metadata. For example, if the total number of lines of code satisfies a lines of code threshold (specified by package property rules 304), then the package metadata risk 132 for the software package may be altered. As one specific example, a software package that includes between 500 and 1000 lines of code may be assigned a smaller package metadata risk 132 than a software package that includes between 10,000 and 20,000 lines of code. In some cases, this risk determination may be based on historical data for various software packages.

In the illustrated embodiment, package metadata analysis module 130 accesses a database 350 that contains package metadata 352 of previously submitted software packages (e.g., which may include information specifying a package type, an application type, external resources access properties, and a number of lines of code for respective previous software packages). In some embodiments, package metadata analysis module 130 retrieves respective risk scores 162 and distribution decisions for the previously submitted software packages from database 350.

Scoring module 312, in the illustrated embodiment, receives risk values for the package metadata of software package 300 determined based on rules 302 and 304 and determines package metadata risk 132 for the package. In the illustrated embodiment, package metadata analysis module 130 outputs package metadata risk 132 for software package 300.

Figure 4:
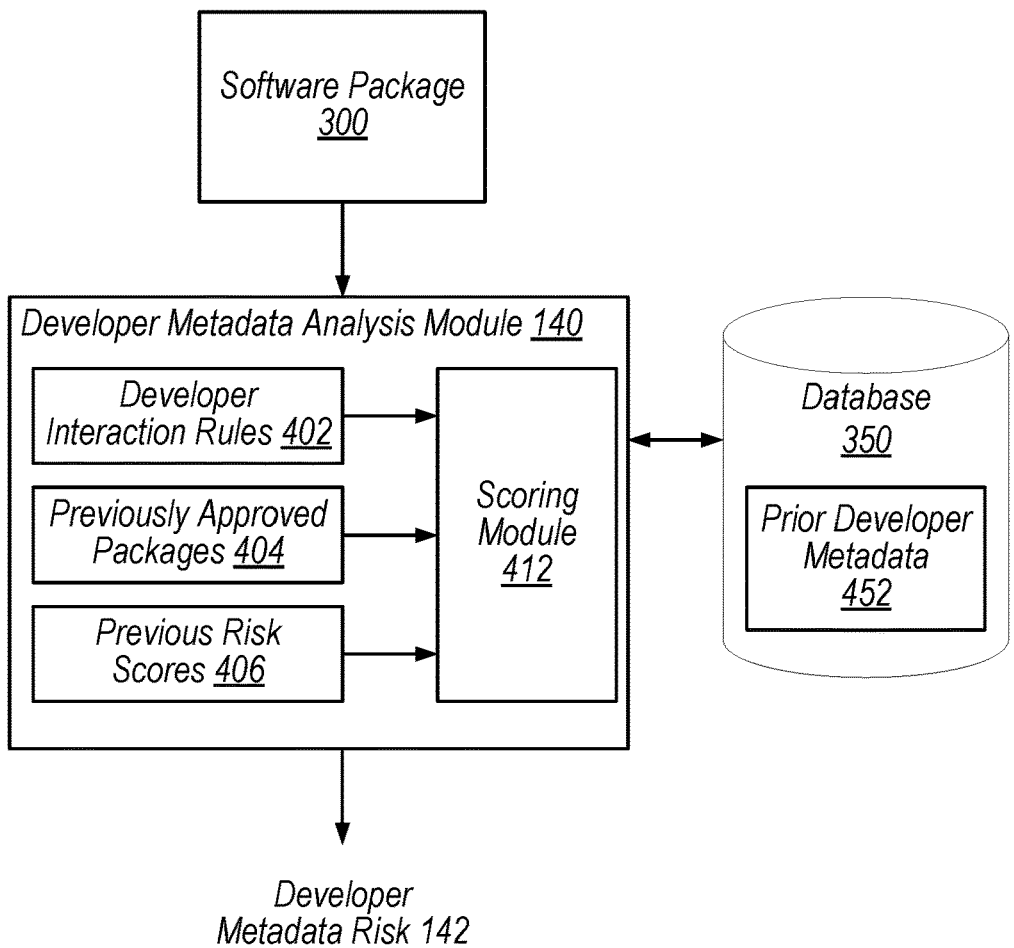
FIG. 4 is a block diagram illustrating an example developer metadata analysis module, according to some embodiments.

FIG. 4 is a block diagram illustrating an example developer metadata analysis module 140 included in package risk assessment module 110. In the illustrated embodiment, developer metadata analysis module 140 determines developer metadata risk 142 for software package 300 requested for inclusion on application exchange service 180 based on developer metadata for the developer of the software package.

Developer interactions rules 402, in the illustrated embodiment, are used by developer metadata analysis module 140 to evaluate software package 300. Developer metadata may specify previous interactions of the developer with the application exchange service 180, PaaS environment 230, SaaS programs 240, or any other service or program included in cloud computer system 100. For example, developer interactions for a developer submitting software package 300 may include one or more issues or vulnerabilities associated with program code written by this developer that were identified through manual review of software packages that were previously submitted by the developer of software package 300.

Previously approved packages 404 may include information specified in the developer metadata of software package 300. This information may indicate a total number of software packages associated with the developer of package 300 that have been approved previously as well as developer metadata risk 142 that was determined for one or more previously requested software packages.

Previous risk scores 406, included in developer metadata, are input to developer metadata analysis module 140. Previous risk scores 406 may include risk scores 162 that were calculated for previously submitted packages of the developer of package 300. For example, this information may also include an indication whether these packages were rejected or approved prior to software package 300.

In the illustrated embodiment, developer metadata analysis module 140 accesses database 350 to obtain prior developer metadata 452 associated with one or more software packages that were developer by the developer of package 300 and were previously evaluated by package risk assessment module 110. In some embodiments, this information includes developer interactions, previously approved packages, and previous risk scores for one or more developers other than the developer of package 300. Prior developer metadata 452 may, for example, affect the developer metadata risk 142 determined for package 300.

Scoring module 412, in the illustrated embodiment, determines a score for software package 300 based on the results of evaluating the package using developer interaction rules 402, previously approved packages 404, previous risk score 406, prior developer metadata 452, etc. In the illustrated embodiment, developer metadata analysis module 140 determines and outputs developer metadata risk 142 based on the score generated by scoring module 412.

Figure 5:
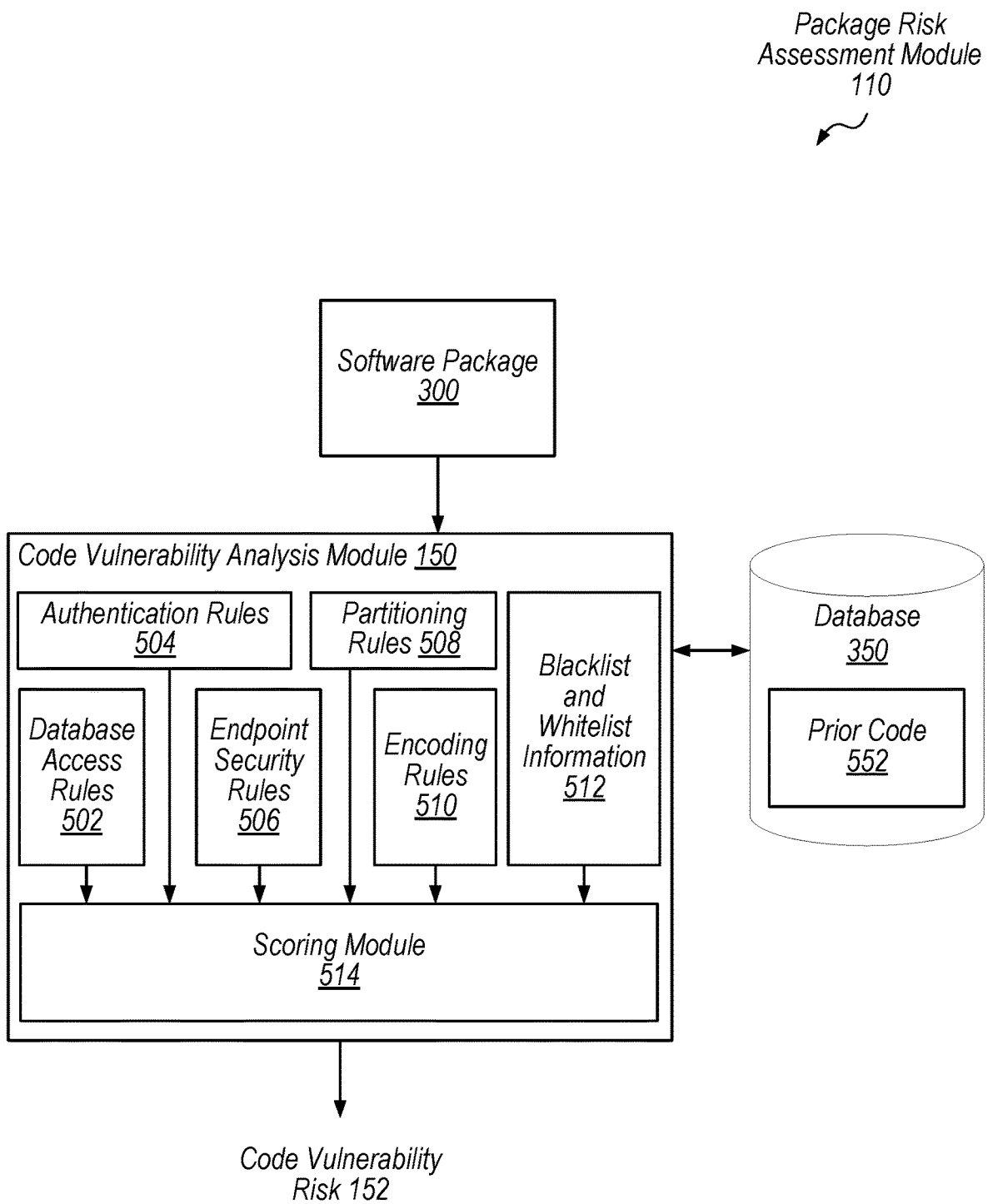
FIG. 5 is a block diagram illustrating an example code vulnerability analysis module, according to some embodiments.

FIG. 5 is a block diagram illustrating an example code vulnerability analysis module 150 included in package risk assessment module 110. In the illustrated embodiment, code vulnerability analysis module 150 determines code vulnerability risk 152 for software package 300 requested for inclusion on application exchange service 180 based on the program code of the package. In the illustrated embodiment, code vulnerability analysis module 150 includes various rules for evaluating the program code of software package 300 and a scoring module 514 for scoring the program code based on the results of evaluating the package using the various rules to assist in determining code vulnerability risk 152 for the package.

Database access rules 502, in the illustrated embodiment, are used by code vulnerability analysis module 150 to determine that the program code of software package 300 includes logic to verify whether a user downloading the package has access rights to content of a multi-tenant database accessed during implementation of the package. In some situations, software package 300 is executable to perform database queries. Code vulnerability analysis module 150 may assess whether the program code of the software package includes logic for verifying access rights for such database queries. In some embodiments, code vulnerability analysis module 150 compares the logic for verifying access rights included in package 300 with information stored in database 350 to ascertain whether the logic satisfies a security threshold (e.g., whether the program code is executable to prevent unauthorized access to information in the database specified by the logic).

In some embodiments, database access rights included in program code of package 300 specify different levels of authorized access. For example, one user may have access to an "accounts" table in a database accessed by the particular software package and another user may have access to a particular field or record within the "accounts" table.

Authentication rules 504, in the illustrated embodiment, are used by module 150 to evaluate whether program code of software package 300 includes one or more secrets that are hardcoded. For example, the developer of a software package may store secrets directly in the program code of that package. In some cases, the secrets are keys used to cryptographically encode (encrypt/decrypt) any of various types of information associated with the software package (e.g., information accessed during execution of the software package, the program code of the software package itself, messages communicated by the software package, authentication information, etc.). In some situations, the developer may store the secrets in debug logs of software packages. In such situations, users downloading these software packages may have unauthorized access to the secrets stored in debug logs, which may cause security issues for the package. For example, these users may be able to use these secrets to access other private information for which they are not authorized. Authentication rules 504 may specify risk values for software packages whose program code includes hardcoded secrets or secrets stored in an unsecure way.

Code vulnerability analysis module 150, in the illustrated embodiment, uses endpoint security rules 506 to evaluate one or more endpoints specified by the program code of a software package that are accessed during package execution. Based on the accessed endpoints, code vulnerability analysis module 150 compares the endpoints to blacklist and whitelist information 512 to determine whether they are included on these lists. In some embodiments, module 150 accesses database 350 or any of various other databases to obtain blacklist and whitelist information 512. In some situations, endpoint security rules may be important in evaluating vulnerability of program code. For example, if a software package is executable to connect to an insecure or unknown endpoint (e.g., an application, API, website, etc.), then execution of this software package may not be implementing proper access control which, in turn, may lead to leakage of private user data.

Evaluating program code of software package 300 using endpoint security rules 506 may also include evaluation of information received from package metadata analysis module 130. For example, package metadata analysis module 130 may determine whether remote site settings are enabled for software package 300 and may provide this information to code vulnerability analysis module 150. Based on this information, code vulnerability analysis module 150 may determine whether one or more external endpoints accessed by the package are included on one or more blacklists. In situations where package metadata analysis module 130 determines that remote site settings are not enabled for package 300, code vulnerability analysis module 150 may not need to evaluate external endpoints for the package. Note that various other outputs of package metadata analysis module 130 may also be input to code vulnerability analysis module 150.

Code vulnerability analysis module 150 evaluates software package 300 using partitioning rules 508 to determine whether program code of the package is properly partitioned. For example, package 300 may include a schema that indicates partitioning of different code included in the package. As one specific example, a software package may include code for a given organization and code obtained from an external third-party source. In this specific example, if the schema of the software package includes a partition between these two sources of code, then the software package may be more secure than if these sources of code were not partitioned (the package did not include a schema) or partitioned in a different manner. In the SALESFORCE.COM context, code partitioning may be accomplished for a particular software package by locker service, when this service is enabled for that package.

Encoding rules 510, in the illustrated embodiment, are used to evaluate whether program code of software package 300 includes logic for encoding or otherwise sanitizing user input before implementation of the input. For example, encoding user input may prevent code from becoming vulnerable to cross-site scripting (XSS) (e.g., data object model (DOM) XSS) or cross-site request forgery (e.g., a one-click attack). As one specific example, if a web page implemented by a software package allows user input but the code of the package does not encode this input, then cross-site scripting attacks may occur. In some situations, a malicious user may insert their own code in the form of a browser-side script into a web page of the software package that accepts user input. A malicious user may also take advantage of open redirection vulnerabilities in the program code. For example, the malicious user may input program code (e.g., a command) when implementing the software package to redirect users to a new endpoint without proper validation rules being applied for the new endpoint. Encoding rules 510 may specify risk values for package 300 based on evaluating the encoding logic included in its program code.

In the illustrated embodiment, code vulnerability analysis module 150 accesses database 350 to obtain prior code 552 for one or more software packages. In some embodiments, database 350 includes prior code vulnerability risk 152 assessments of different software packages, as well as database access rights, authentication properties, endpoint security information, code partitioning information, and user input encoding information for previously submitted software packages. Code vulnerability analysis module 150 may determine code vulnerability risk 152 for software package 300 based on information stored in database 350.

Note that information stored in database 350 relating to a developer of package 300 is evaluated as part of the developer metadata of the package and is not considered as part of the evaluation performed by code vulnerability analysis module 150. For example, the code vulnerability risk 152 of one or more software packages that were previously submitted by the developer associated with software package 300 may be considered by developer metadata analysis module 140 when determining developer metadata risk 142.

Scoring module 514, in the illustrated embodiment, receives results of evaluating program code of software package 300 based on rules 502, 504, 506, 508, 510, and information 512. Module 514 then determines a score for package 300 which may be used by code vulnerability analysis module 150 to determine code vulnerability risk 152 for the package.

In some embodiments, code vulnerability analysis module 150, outputs information specifying details for identified code vulnerabilities for software package 300 and how these vulnerabilities impact the code vulnerability risk 152 determined for the package. In some embodiments, based on the results of an analysis of package 300 performed by package metadata analysis module 130, code vulnerability analysis module 150 does not determine code vulnerability risk 152 for the package. For example, if package 300 does not include system-level code, package risk assessment module 110 skips the step of analyzing the program code of the package. As another example, if remote site settings is not enabled for a software package, package risk assessment module 110 may not analyze a subset of the rules/information illustrated in FIG. 5 for that package. Specifically, module 110 may not use endpoint security rules or evaluate blacklist and whitelist information when determining code vulnerability risk 152 for software package 300.

As one specific example of risk evaluation, in the SALESFORCE.COM context, a software package that includes a schema and client JS code or some sort of SALESFORCE LIGHTNING component with locker enabled, and does not include a backend Apex controller is likely to pose a lower security risk (with other factors being equal) than a software package that has a schema, Apex controllers, and remote site settings enabled (e.g., accesses an unknown API endpoint). As another example, software packages that allow package-to-package communication (e.g., unmanaged packages) may be associated with higher risk than those that do not allow this type of communication.

Example Method

Turning now to FIG. 6, a flow diagram illustrating an example method 600 for determining whether to permit distribution of a software package based on package metadata of the software package. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a computer system receives, from a developer, a request that specifies a software package to be distributed to an application exchange service of a cloud computer system.

At 620, the computer system calculates a risk score for the software package based on package metadata of the software package, where the package metadata specifies one of a plurality of package types supported by the application exchange service. In some embodiments, the specified package type is indicative of an amount of control of the developer on the software package after distribution. In some embodiments, the plurality of package types includes a first package type that allows a software package to be edited after distribution and does not permit a developer of the software package to retain control after distribution. For example, the first package type may indicate that the software package is an unmanaged package. In some embodiments, the plurality of package types includes a second package type that allows the developer of the software package to push upgrades after distribution. For example, the second package type may indicate that the software package is a managed package.

In some embodiments, the package metadata specifies namespace properties of the software package. In some embodiments, the namespace properties of the software package specify a region of security for one or more components of the software package, where the region of security prevents unauthorized access to the one or more components of the software package. In some embodiments, the region of security further prevents generation of duplicate custom names for the one or more components of the software package and one or more components of other software packages.

In some embodiments, the namespace of the software package prevents one or more users of the cloud-based application platform who downloaded the software package from accessing one or more components of the software package without authorization, where the namespace of the software package includes a namespace prefix that is a unique identifier of the software package. In some embodiments, the namespace prefix prevents generation of duplicate custom names for one or more components of the software package and one or more similar components of other software packages. In some embodiments, the namespace properties of the namespace of the software package specify that the namespace is unique to the software package and is not shared by one or more other software packages. In some embodiments, the namespace properties specify that the namespace of the software package is a shared namespace where one or more other software packages share the namespace of the software package.

In some embodiments, calculating the risk score is further based on developer metadata relating to previous interactions of the developer with the application exchange service. In some embodiments, the developer metadata includes one or more of the following types of information: previous interactions of the software developer with the application exchange service, a number of software packages submitted by the software developer that were permitted for distribution, respective risk scores for software packages previously submitted by the software developer.

In some embodiments, calculating the risk score is further based on one or more vulnerability assessments of code included in the software package. In some embodiments, the software package is executable to perform database queries. In some embodiments, the one or more vulnerability assessments of code included in the software package include logic for verifying access rights for the database queries. In some embodiments, analysis of code vulnerabilities includes: determining whether the code includes logic for verifying database access rights of different users implementing the software package, determining whether the code automatically encodes user input to prevent unauthorized code injection, determining whether one or more secret keys are hardcoded in the code.

At 630, the computer system determines, based on a comparison of the calculated risk score to a risk threshold, whether to permit distribution of the software package to users via the application exchange service. In some embodiments, determining whether to permit distribution of the software package further includes automatically approving the software package for distribution based on the calculated risk score. In some embodiments, the software package is developed in a platform as a service (PaaS) environment of the cloud computer system, and wherein, after distribution via the application exchange service, the software package is installable by organizations of the cloud computer system to extend functionality of software as a service (SaaS) programs of the cloud computer system.

In some embodiments, the computer system is a multi-tenant database system. In some embodiments, the namespace of the software package is shared by one or more other software packages. In some embodiments, a namespace of a software package is shared by all software packages associated with a particular tenant of the multi-tenant database system. In some embodiments, the shared namespace is associated with a particular tenant within the multi-tenant database system. For example, this type of shared namespace is not associated with other tenants of the multi-tenant database and is specific to the particular tenant.

Automating a primary review process for cloud-based software packages may advantageously reduce the number of software packages that require tedious manual review. In addition, determining risk scores for various software packages may advantageously allow for prioritization of review for software packages that require further manual review after being assessed by a risk assessment module. Assessing software packages using a risk assessment module may advantageously reduce the time between software package development and distribution which in turn may improve the functionality of SaaS programs in the cloud computing environment for organizations that installed the software packages. In some situations, automating review of software packages using a risk assessment module may advantageously free up system resources.

Example Computing Device

Figure 7:
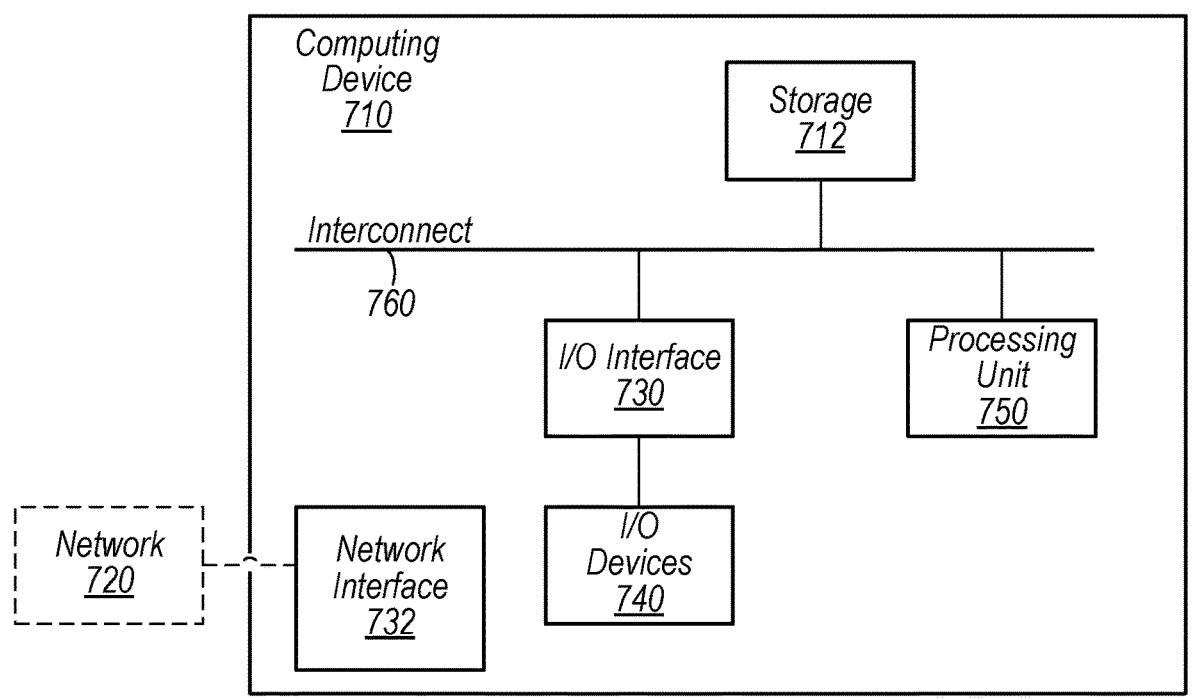
FIG. 7 is a block diagram illustrating an example computing device, according to some embodiments.

Turning now to FIG. 7, a block diagram of a computing device (which may also be referred to as a computing system) 710 is depicted, according to some embodiments.

Computing device 710 may be used to implement various portions of this disclosure. Computing device 710 is one example of a device that may be used as a mobile device, a server computer system, a client computer system, or any other computing system implementing portions of this disclosure.

Computing device 710 may be any suitable type of device, including, but not limited to, a personal computer system, desktop computer, laptop or notebook computer, mobile phone, mainframe computer system, web server, workstation, or network computer. As shown, computing device 710 includes processing unit 750, storage subsystem 712, and input/output (I/O) interface 730 coupled via interconnect 760 (e.g., a system bus). I/O interface 730 may be coupled to one or more I/O devices 740. Computing device 710 further includes network interface 732, which may be coupled to network 720 for communications with, for example, other computing devices.

Processing unit 750 includes one or more processors and, in some embodiments, includes one or more coprocessor units. In some embodiments, multiple instances of processing unit 750 may be coupled to interconnect 760. Processing unit 750 (or each processor within processing unit 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

As used herein, the term "processing unit" refers to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory in some embodiments. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In some embodiments, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 7 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system from a developer, a request that specifies a software package to be distributed to an application exchange service of a cloud computer system;
   calculating, by the computer system, a risk score for the software package based on package metadata of the software package and based on developer metadata relating to previous interactions of the developer with the application exchange service, wherein the package metadata specifies one of a plurality of package types supported by the application exchange service, wherein the specified package type is indicative of an amount of control of the developer on the software package after distribution; and
   determining, by the computer system based on a comparison of the calculated risk score to a risk threshold, whether to permit distribution of the software package to users via the application exchange service.

2. The method of claim 1, wherein the plurality of package types includes:
   a first package type that allows a software package to be edited after distribution and does not permit a developer of the software package to retain control after distribution; and
   a second package type that allows the developer of the software package to push upgrades after distribution.

3. The method of claim 1, wherein the package metadata specifies namespace properties of the software package.

4. The method of claim 3, wherein the namespace properties of the software package specify a region of security for one or more components of the software package, wherein the region of security prevents unauthorized access to the one or more components of the software package.

5. The method of claim 4, wherein the region of security further prevents generation of duplicate custom names for the one or more components of the software package and one or more components of other software packages.

6. The method of claim 1, wherein calculating the risk score is further based on one or more vulnerability assessments of code included in the software package.

7. The method of claim 6, wherein the software package is executable to perform database queries, and wherein the one or more vulnerability assessments of code included in the software package include logic for verifying access rights for the database queries.

8. The method of claim 6, wherein the determining whether to permit distribution of the software package further includes automatically approving the software package for distribution based on the calculated risk score.

9. The method of claim 1, wherein the software package is developed in a platform as a service (PaaS) environment of the cloud computer system, and wherein, after distribution via the application exchange service, the software package is installable by organizations of the cloud computer system to extend functionality of software as a service (SaaS) programs of the cloud computer system.

10. A non-transitory computer-readable medium having instructions stored thereon that are capable of causing a computer system to implement operations comprising:
    receiving, from a developer, a request that specifies a software package to be distributed to an application exchange service of a cloud computer system;
    calculating a risk score for the software package based on package metadata of the software package and based on developer metadata relating to previous interactions of the developer with the application exchange service, wherein the package metadata specifies one of a plurality of package types supported by the application exchange service, wherein the specified package type is indicative of an amount of control of the developer on the software package after distribution; and
    determining, based on a comparison of the calculated risk score to a risk threshold, whether to permit distribution of the software package to users via the application exchange service.

11. The non-transitory computer-readable medium of claim 10, wherein the plurality of package types includes:
    a first package type that allows a software package to be edited after distribution and does not permit a developer of the software package to retain control after distribution; and
    a second package type that allows the developer of the software package to push upgrades after distribution.

12. The non-transitory computer-readable medium of claim 10, wherein the package metadata specifies namespace properties of the software package.

13. The non-transitory computer-readable medium of claim 12, wherein the namespace properties of the software package specify a region of security for one or more components of the software package, wherein the region of security prevents unauthorized access to the one or more components of the software package.

14. The non-transitory computer-readable medium of claim 13, wherein the region of security further prevents generation of duplicate custom names for the one or more components of the software package and one or more components of other software packages.

15. The non-transitory computer-readable medium of claim 10, wherein calculating the risk score is further based on one or more vulnerability assessments of code included in the software package.

16. The non-transitory computer-readable medium of claim 15, wherein the software package is executable to perform database queries, and wherein the one or more vulnerability assessments of code included in the software package include logic for verifying access rights for the database queries.

17. The non-transitory computer-readable medium of claim 15, wherein the determining whether to permit distribution of the software package further includes automatically approving the software package for distribution based on the calculated risk score.

18. A system, comprising:
at least one processor; and
a memory having instructions stored thereon that are executable by the at least one processor to cause the system to:
receive, from a developer, a request that specifies a software package to be distributed to an application exchange service of a cloud computer system;
calculate a risk score for the software package based on package metadata of the software package and based on developer metadata relating to previous interactions of the developer with the application exchange service, wherein the package metadata specifies one of a plurality of package types supported by the application exchange service, wherein the specified package type is indicative of an amount of control of the developer on the software package after distribution; and
determine, based on a comparison of the calculated risk score to a risk threshold, whether to permit distribution of the software package to users via the application exchange service.

19. The system of claim 18, wherein the plurality of package types includes:
a first package type that allows a software package to be edited after distribution and does not permit a developer of the software package to retain control after distribution; and
a second package type that allows the developer of the software package to push upgrades after distribution.

20. The system of claim 19, wherein the package metadata specifies namespace properties of the software package.

* * * * *